(12) United States Patent
Odell

(10) Patent No.: US 9,276,831 B2
(45) Date of Patent: Mar. 1, 2016

(54) DETERMINING NETWORK LATENCY WITH LIMITED COMPUTING RESOURCES

(71) Applicant: Fluke Corporation, Everett, WA (US)

(72) Inventor: Craig Odell, Colorado Springs, CO (US)

(73) Assignee: Airmagnet, Inc., Sunnyvale, CA (US)

( * ) Notice: Subject to any disclaimer, the term of this patent is extended or adjusted under 35 U.S.C. 154(b) by 203 days.

(21) Appl. No.: 13/945,084

(22) Filed: Jul. 18, 2013

(65) Prior Publication Data

US 2015/0023203 A1    Jan. 22, 2015

(51) Int. Cl.
*H04L 12/26* (2006.01)

(52) U.S. Cl.
CPC .......... *H04L 43/0852* (2013.01); *H04L 43/106* (2013.01)

(58) Field of Classification Search
CPC .............. H04L 43/0852; H04L 43/106; H04L 12/2684; H04L 9/3297; H04L 1/1678; H04J 3/065; H04J 3/067
USPC ........................................................ 370/253
See application file for complete search history.

(56) References Cited

U.S. PATENT DOCUMENTS

| | | | |
|---|---|---|---|
| 2009/0304007 A1* | 12/2009 | Tanaka et al. | 370/395.53 |
| 2014/0010094 A1* | 1/2014 | Robitaille et al. | 370/252 |
| 2014/0089720 A1* | 3/2014 | Schmit | 713/501 |
| 2014/0177455 A1* | 6/2014 | Astigarraga et al. | 370/252 |
| 2014/0177653 A1* | 6/2014 | Tzeng | 370/503 |
| 2014/0253386 A1* | 9/2014 | Sun et al. | 342/387 |

* cited by examiner

*Primary Examiner* — Omar Ghowrwal
*Assistant Examiner* — Ellen A Kirillova
(74) *Attorney, Agent, or Firm* — Locke Lord LLP; Scott D. Wofsy; Christopher J. Capelli

(57) ABSTRACT

Disclosed are techniques for accurately determining network latency. The techniques include steps for transmitting a latency packet between a network test device and a remote network node. The techniques particularly include steps for recording timestamps upon transmission and receipt of the latency packet by the respective network device and the remote network node. Network latency is determined based on a difference between timestamps of the network device (transmitting and receiving the latency packet) and a difference between the timestamps of the remote network node (transmitting and receiving the latency packet).

16 Claims, 6 Drawing Sheets

DETERMINING NETWORK LATENCY WITH LIMITED COMPUTING RESOURCES

BACKGROUND

1. Field of the Invention The present disclosure relates to network testing, and more particularly, to determining latency of a communication network with limited computing resources.

2. Description of the Related Art

Network latency or network delay affects overall performance of communication networks. Network latency indicates how long it takes for data to travel from one node to another node in a communication network, which latency typically differs depending on various network conditions (e.g., locations of specific pairs of communicating nodes, types of protocols, communication medium, etc.).

Determining network latency amongst various network nodes is important for numerous network testing and design scenarios. With respect to network testing, measuring latency, in some scenarios, typically includes transmitting a data packet (e.g., an Internet Protocol (IP) packet) from a source node to a remote node (e.g., via Internet Control Message Protocol (ICMP) Echo Requests (e.g., Ping, etc.)) and receiving a reflected IP packet from the remote node. Latency is determined by the time it takes for the data packet to be transmitted from the source node, reflected by the remote node, and ultimately received back at the source node. However, when the data packet is reflected from the remote node, the data packet is typically subjected to additional processing (e.g., propagation through the remote node's network stack such as the four Open Systems Interconnection (OSI) layers of respective remote nodes) prior to transmission or reflection of the data packet back to the source node. Additionally, the data packet may be subjected to similar additional processing by the source node upon receipt. All the additional processing can skew latency determinations due to varying hardware and/or software configurations of the source node and remote node resulting in inaccurate latency determinations.

Despite efforts to date, there is still a need in the art for improved systems, methods and apparatus to accurately determine latency in communication networks. The present invention provides a solution for these problems.

SUMMARY

According to one or more embodiments of the disclosure, network latency is determined based upon timestamps associated with transmitting and receiving a latency packet between a network test device and a remote node. Particularly, the techniques described herein provide steps for transmitting a latency packet via a network test device to at least one remote node in a communication network and generating, via the network test device, a first timestamp associated with transmission of the latency packet. The latency packet is reflected from a remote node (e.g., a router, a switch, a server, another network test device, etc.) back to the network test device, which network test device generates a second time stamp upon receipt. The remote node, similar to the network test device, generates timestamps associated with receiving and transmitting the latency packet. In particular, the remote node generates a third timestamp associated with receipt of the latency packet from the network test device and a fourth timestamp associated with transmitting the latency packet to the network test device. Both timestamps are transmitted to and received by the network test device and are further used to determine network latency. Particularly, the network test device determines latency based on a difference between the second timestamp and the first timestamp and a difference between the fourth timestamp and the third timestamp. For example, the difference between the fourth timestamp and the third timestamp can be subtracted from the difference between the second timestamp and the first timestamp to yield the network latency.

In some embodiments, each of the timestamps (e.g., the first, second, third and fourth timestamps) are indexed according to a sequence number to organize each timestamp according to a particular latency packet.

In certain other embodiments, the latency packet includes one or more bits. In such embodiments, the first and second timestamps are generated as follows: The first timestamp is generated once the first bit of the latency packet is transmitted from the network test device to the remote node; and the second timestamp is generated once the first bit of the latency packet is received from the remote node at the network test device.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

A component or a feature that is common to more than one drawing is indicated with the same reference number in each of the drawings.

DESCRIPTION OF EXAMPLE EMBODIMENTS

Overview

According to one or more embodiments of the disclosure, a network test device transmits a latency packet to at least one remote node in a communication network. The network test device generates a first timestamp associated with transmission of the latency packet and a second time stamp associate with receiving the latency packet reflected from a remote node. At the remote node, the latency packet is received, processed and reflected back to the local network test device. The latency packet, when received by the remote node, causes the remote node to generate a third timestamp associated with receiving the latency packet. Similarly, when the latency packet is transmitted or reflected back to the network test device from the remote node, the remote node generates a fourth timestamp associated with transmission of the latency packet. The network test device determines a network latency of the communication network based on a difference between the first timestamp and the second timestamp and a difference between the third timestamp and the fourth timestamp.

Description

A communication network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

Figure 1:
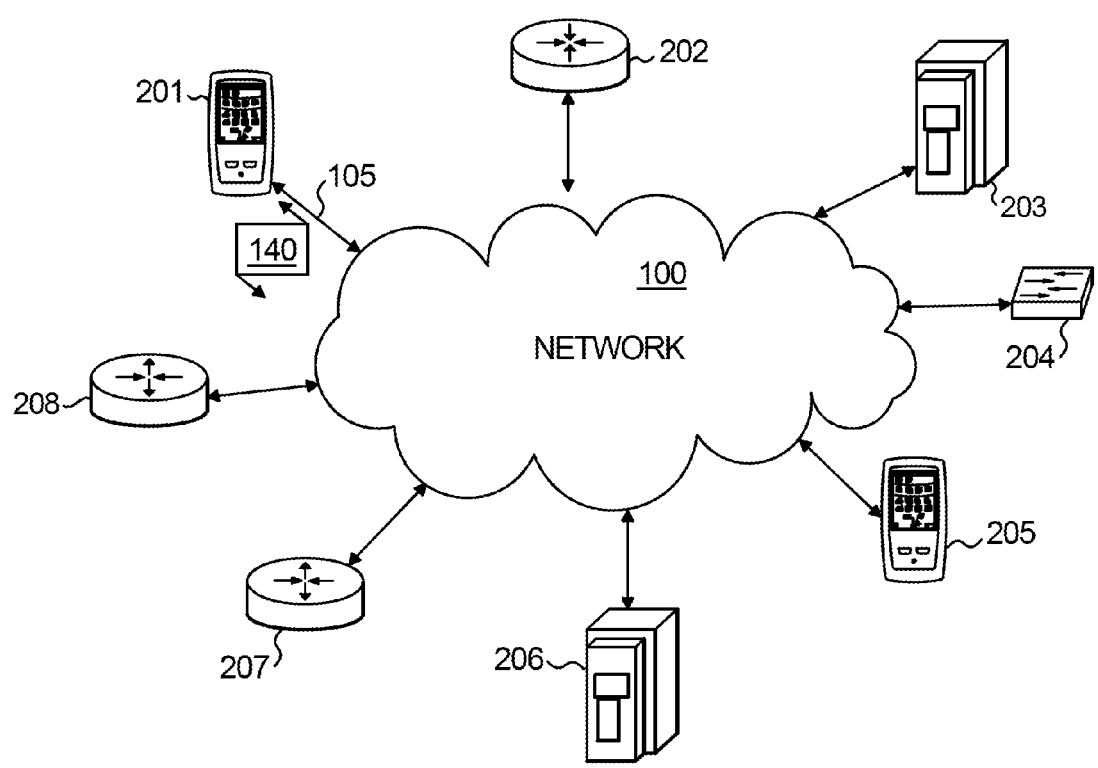
FIG. 1 illustrates an example communication network.

FIG. 1 is a schematic block diagram of an example communication network 100 illustratively comprising nodes/devices 201-208 (e.g., client devices, servers, routers, switches, and the like) interconnected by various methods of communication. For instance, the links 105 may be wired links or may comprise a wireless communication medium, where certain nodes are in communication with other nodes, e.g., based on distance, signal strength, current operational status, location, etc. Moreover, each of the devices can communicate data packets (or frames) 140 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

Figure 2:
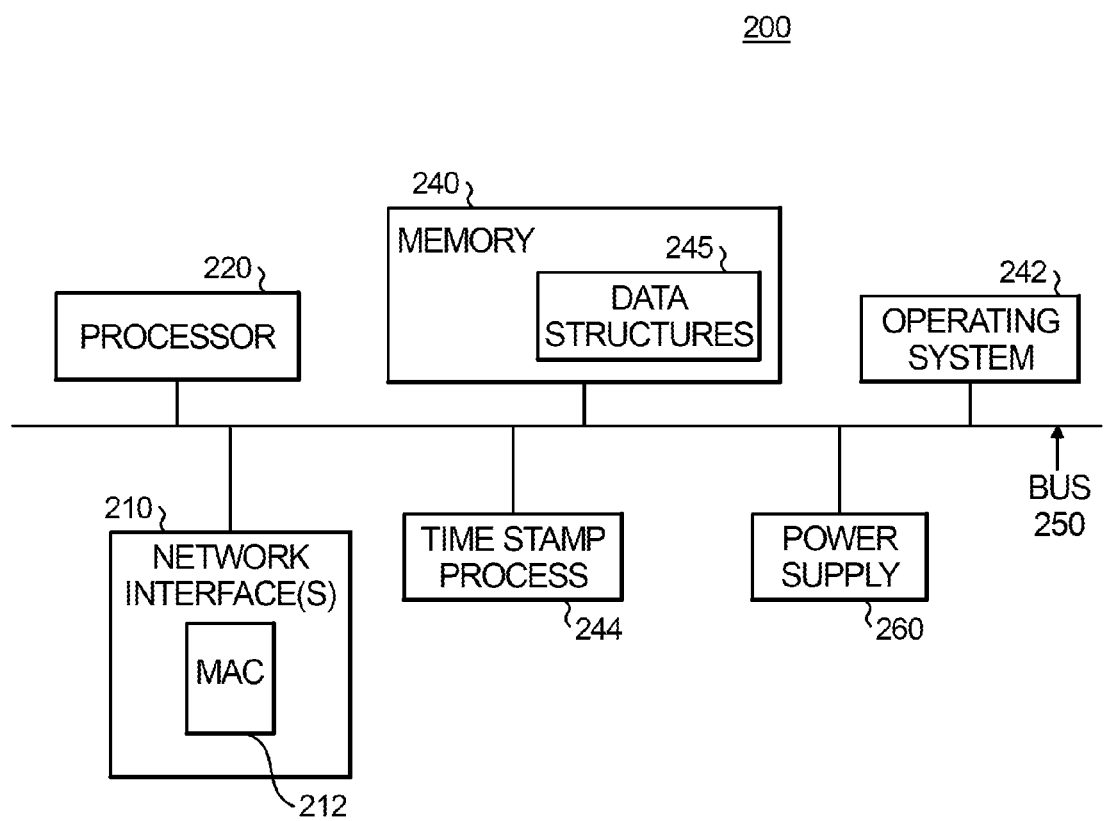
FIG. 2 illustrates an example network device/node.

FIG. 2 is a schematic block diagram of an example network device 200 (e.g., one of network devices 201-208) that may be used with one or more embodiments described herein, e.g., as one of the nodes shown in the network 100. Device 200 may comprise one or more network interfaces 210, at least one processor 220, and a memory 240 interconnected by a system bus 250.

The network interface(s) 210 contain the mechanical, electrical, and signaling circuitry for controlling operation of device 200 and can include a media access controller (MAC) 212, which can communicate data to/from network 100 using a variety of different communication protocols.

Memory 240 comprises a plurality of storage locations that are addressable by the processor 220, MAC 212 and the network interfaces 210 for storing software programs and data structures associated with the embodiments described herein. Note that certain embodiments of device 200 may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor and/or network interfaces 210 (i.e., via MAC 212), functionally organizes the device by, inter alia, invoking operations in support of software processes and/or services executing on the device. These software processes and/or services comprise an illustrative timestamp process/services 244, as described herein. Note that such process/service 244 may be centralized in memory 240, or alternatively, such process/service can be employed within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. Illustratively, the techniques described herein may be performed by hardware, software, and/or firmware, such as in accordance with the timestamp process 244, which may contain computer executable instructions executed by the processor 220 (and/or MAC 212) to perform functions relating to the techniques described herein.

As noted above, conventional network latency testing techniques are inaccurate due to additional processing at various network nodes such as propagation of data packets through Open Systems Interconnection (OSI) layers at the various network nodes prior to re-transmission. Accordingly, the techniques described herein accurately determine network latency using limited-computing resources using timestamps. In particular, in one or more specific embodiments, the techniques use timestamps indexed or sequenced according to transmission or receipt of latency packets to subtract out additional processing at various nodes (e.g., endpoint hosts). Such techniques, as described herein, accurately determine true network latency and can be employed by, for example, devices having limited computing resources (e.g., devices without Field Programmable Gate Arrays (FPGAs)).

Figure 3:
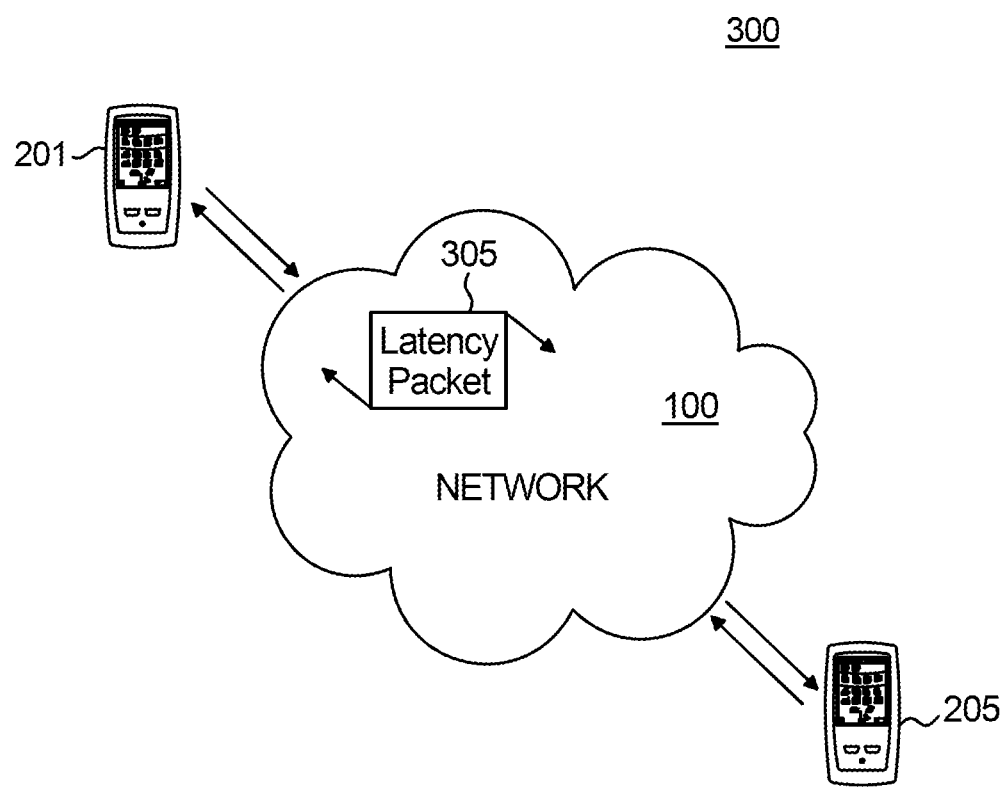
FIG. 3 illustrates an example view of a latency packet exchanged between network nodes of the communication network shown in FIG. 1.

Illustratively, referring to FIG. 3, a latency packet is exchanged between network nodes of communication network 100. As shown, network node 201 (shown as a network test device) transmits a latency packet 305 to a remote network node 205 (shown as another network test device). Operatively, remote network node 205 reflects (e.g., receives and transmits) latency packet 305 back to network node 201. As discussed above, techniques such as the timestamp process 244 marks a time when the latency packet is transmitted/received by each of network nodes 201 and 205 and use the marked time to determine network latency.

Figure 4:
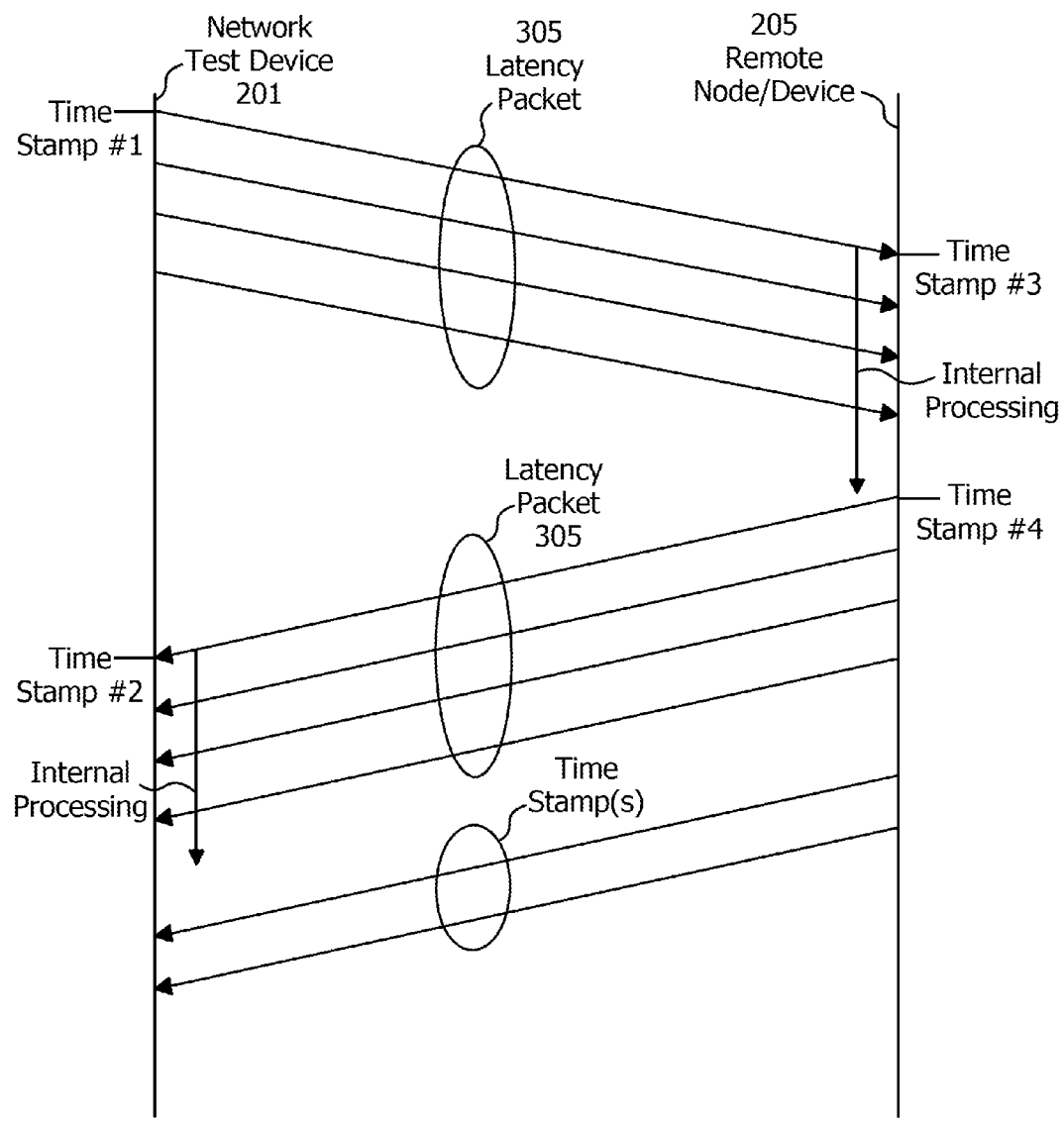
FIG. 4 illustrates signal diagram of the latency packet exchanged amongst the network nodes shown in FIG. 3.

In particular, referring to FIG. 4, a signal diagram 400 illustrates the timestamp process 244 when latency packet 305 is exchanged amongst network nodes 201 and 205. Operatively, network test device 201 transmits a latency packet 305 to a remote network node 205. When the first byte or nibble of the latency packet 305 is transmitted, network test device 201 records a timestamp—shown as Timestamp # 1. For example, referring to the hardware configuration shown in FIG. 2, a processor 220 of network test device 201 instructs MAC 212 to record timestamps (e.g., via IEEE 1588 Precision Time Protocol (PTP) and supporting hardware). Further, such timestamps are typically recorded and stored into memory 240 (e.g., data structures 245).

Still referring to FIG. 4, when the first byte or nibble of latency packet 305 is received by the remote node 205, the remote network node 205 records a timestamp—Timestamp #3. The latency packet is then processed by remote network node 205 and reflected back to network test device 201. Remote network node 205 records Timestamp #4 when the first byte of latency packet 305 is transmitted back to network test device 201. In turn, network test device 201 receives the reflected latency packet from the remote network node 205 and records Timestamp #2 when the first byte of latency packet 305 is received.

Notably, Timestamps #3 and #4 are typically transmitted separately to network test device 201. In certain embodiments, timestamps from the remote network node 205 are typically transmitted to network test device 201 (e.g., via Transmission Control Protocol (TCP)) in separate data packets. Further, as described above, the timestamps are indexed or sequenced according to the latency packet such that each timestamp is associated with a particular latency packet for a particular latency test.

Once the latency test is complete, network test device 201 determines the network latency based on the timestamps. In particular, a network test device 201 determines network latency as follows:

$$\text{Latency} = (T_{nearReceive} - T_{nearTransmit}) - (T_{remoteTransmit} - T_{remoteReceive})$$

Where:
$T_{nearReceive}$ is Timestamps #2
$T_{nearTransmit}$ is Timestamps #1
$T_{remoteTransmit}$ is Timestamps #4
$T_{remoteReceive}$ is Timestamps #3

Determining latency in this fashion accounts for the internal processing time it takes for remote node 205 to receive latency packet 305 and transmit latency packet 305 back to network test device 201. As discussed above, such internal processing depends on varying hardware and software electronics at remote node 205, which leads to inconsistent and skewed network latency determinations.

Figure 5:
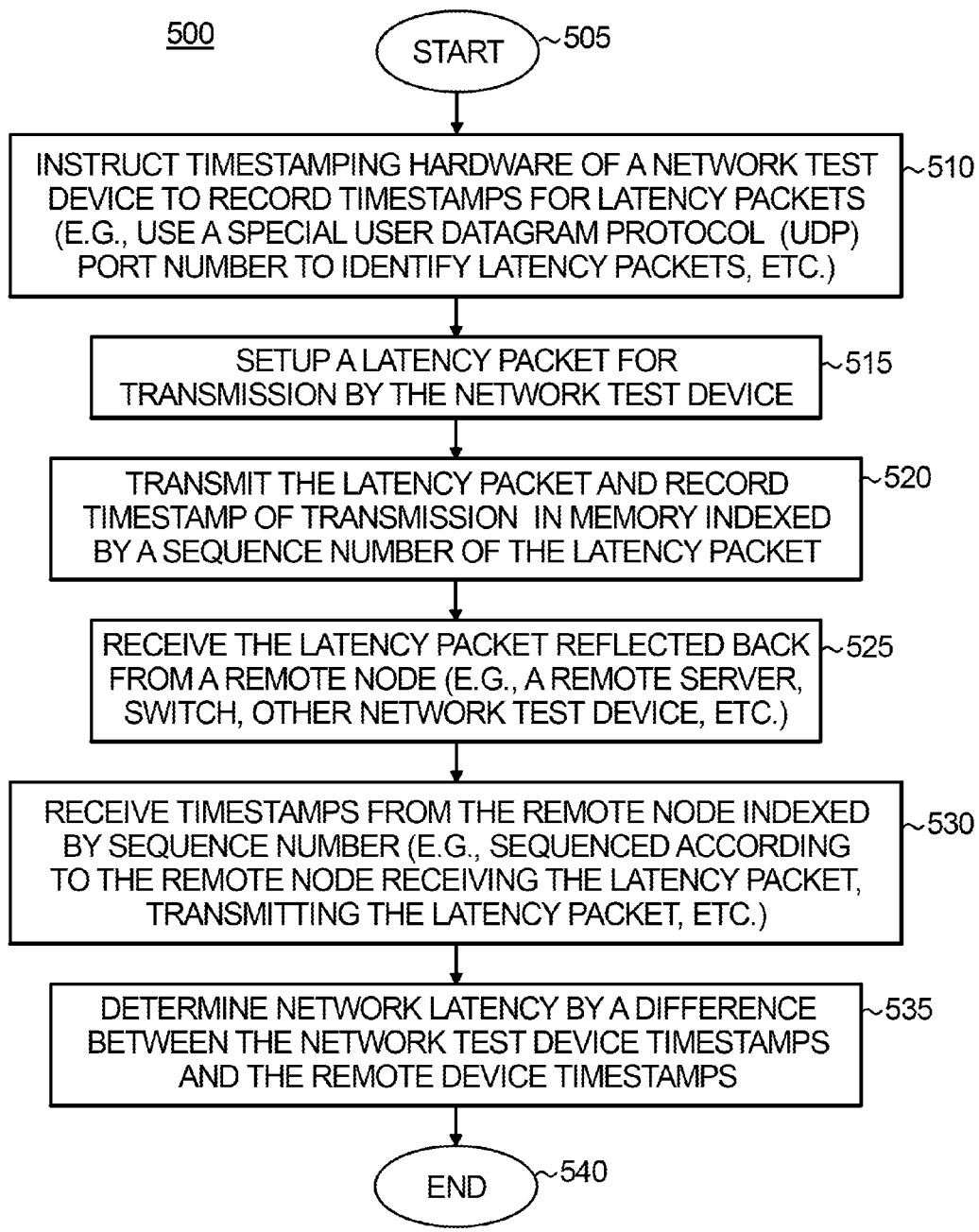
FIG. 5 illustrates an example simplified procedure for determining latency in a communication network, particularly from the perspective of a local network test device.

FIG. 5 illustrates an example simplified procedure 500 for determining network latency from the perspective of a network test device (e.g., network test device 201). The procedure 500 starts at step 505, and continues to step 510, where the network test device instructs timestamping hardware (e.g., MAC 212) to record timestamps for latency packets. For example, in certain embodiments, the network test device instructs MAC 212 to record timestamps via a special User Datagram Protocol (UDP) port number to identify latency packets. Next, in step 515, the network test device sets up a sequenced latency packet for transmission, and in step 520, the network test device transmits the latency packet. As described in greater detail above, when the network test device transmits the latency packet, the network test device further records a timestamp in memory. Such timestamp is typically indexed by a sequence number of the particular latency packet. In step 525, the network test device receives a reflected latency packet from a remote node (e.g., remote node 205), and in step 530, the network test device further receives timestamps from the remote node indexed by the sequence number. Such subsequent timestamps, as discussed above, are associated with the remote node receiving the latency packet from the network test device and transmitting the latency packet back to the network test device. In step 535, the network test device determines a network latency based on differences between the network test device's timestamps (transmit and receive timestamps) and differences between the remote node's timestamps (transmit and receive timestamps). Procedure 500 subsequently terminates in step 540, or in certain embodiments it continues to step 520 with the network test device transmitting a latency packet and recording a timestamp of transmission.

Figure 6:
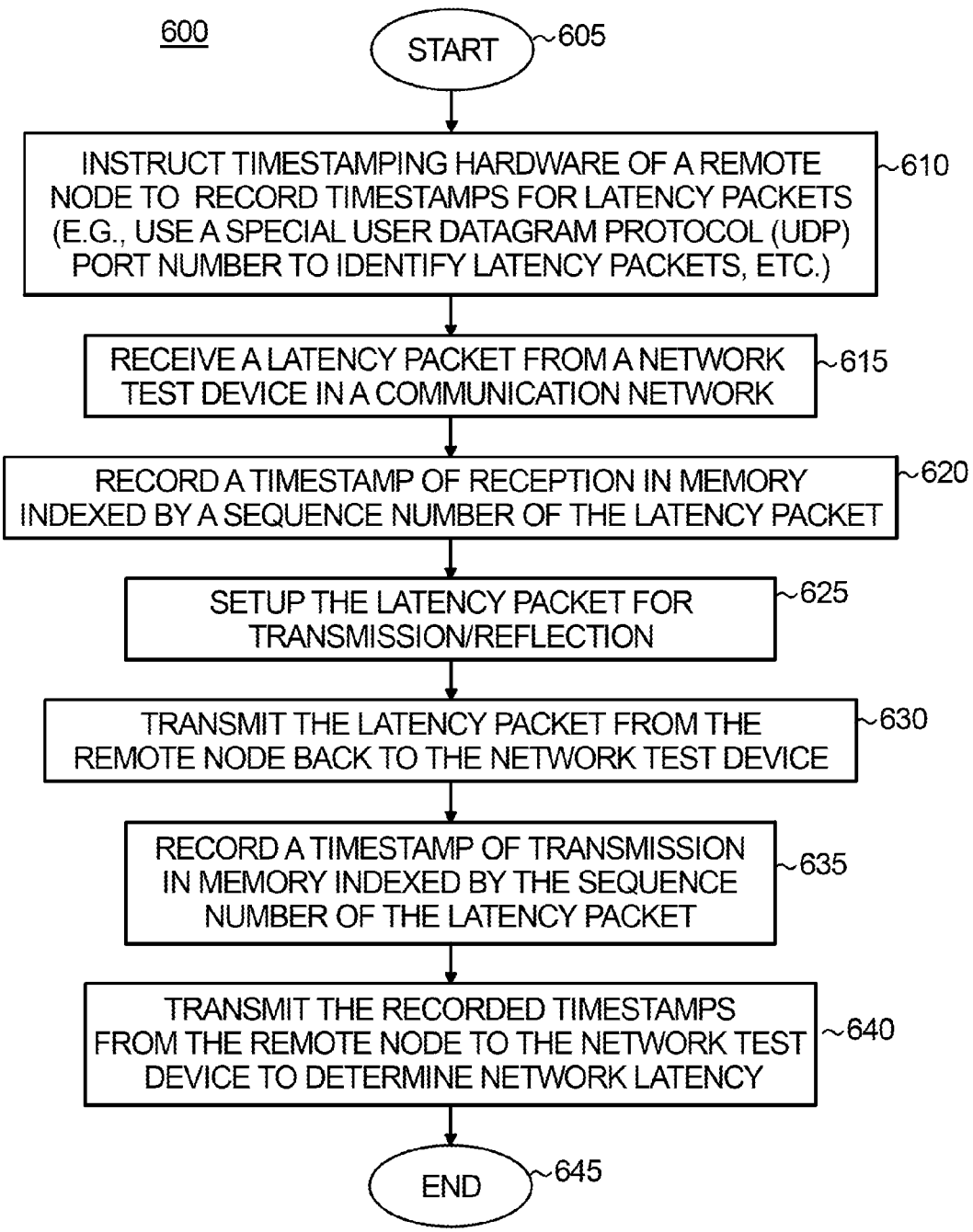
FIG. 6 illustrates an example simplified procedure for determining latency in a communication network, particularly from the perspective of a remote network test device.

FIG. 6 illustrates an example simplified procedure 600 for determining network latency from the perspective of a remote network test device or remote node (e.g., remote node 205). The procedure 600 starts at step 605, and continues to step 610, where as discussed in greater detail above, the remote node instructs timestamping hardware (e.g., MAC 212 of the remote device) to record timestamps for latency packets. Next, in step 615, the remote node receives a latency packet from the network test device (described above) and in step 620, the remote node records a timestamp reflecting a time of reception (e.g., when the first bit of the latency packet is received from the network test device). As described above, the timestamp is typically indexed according to a sequence number associated with the latency packet. At step 625, the remote node internally processes the latency packet and sets up the latency packet for transmission as a reflected packet. Once processed, at step 630, the remote node transmits the latency packet to the network test device, and at step 635, the remote node records a timestamp of transmission in memory (e.g., when the first bit of the latency packet is transmitted). As discussed above, the timestamp of transmission by the remote node is typically indexed according to a sequence number associated with the latency packet. Once the timestamp of transmission is recorded, the remote node, in step 640, transmits the timestamps to the network test device to determine network latency. Procedure 600 can subsequently end in step 645, or can continue on in step 615 where the remote node receives a latency packet.

It should be noted that while certain steps within procedures 500-600 may be optional and the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, accurately determine network latency using timestamps. Further, the simplicity of these techniques allow for devices having limited hardware resources to determine network latency. In particular, the techniques herein account for internal processing amongst various remote network nodes (e.g., due to varying internal hardware/software resources) and accurately determines network latency.

While there have been shown and described illustrative embodiments that provide for determining network latency, it is to be understood that various other adaptations and modifications may be made within the spirit and scope of the embodiments herein.

For example, the embodiments have been shown and described herein with timestamps recorded at initial receipt or transmission of a byte/nibble of a latency packet. However, the embodiments in their broader sense are not as limited as such, and may, in fact, be triggered/recorded by any of the bytes/nibbles of a latency packet. Moreover, while a particular ordering of the timestamps is shown, such ordering is provided for simplicity and is not to be construed as limiting any other ordering that may be used within the scope of this invention.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   transmitting a latency packet via a network test device to at least one remote node in a communication network;
   generating, via tile network test device a first timestamp associated with transmission of the latency packet;
   receiving the latency packet at the network test device, the latency packet being reflected from the at least one remote node;
   generating a second timestamp associated with receiving the latency packet at the network test device;
   receiving a third timestamp and a fourth time stamp at the network test device, the third timestamp being associated with receipt of the latency packet by the at least one remote node and the fourth time stamp being associated with transmission of the latency packet to the network test device by the at least remote one node, wherein the third and fourth timestamps are transmitted by the at least one remote node in one or more packets different from the latency packet, wherein the third and fourth timestamps are recorded and then transmitted by the at least one remote node in one or more data packets different from the latency packet; and
   determining a network latency of the communication network via the network test device based on a difference between the second timestamp and the first timestamp and a difference between tile fourth timestamp and the third timestamp.

2. The method of claim 1, wherein determining the network latency of the communication network further comprises:
   determining the network latency of the communication network by subtracting the difference between the fourth timestamp and the third timestamp from the difference between the second timestamp and the first timestamp.

3. The method of claim 1, further comprising:
   indexing each of the first timestamp, the second timestamp, the third timestamp and the fourth timestamp according to a corresponding sequence number.

4. The method of claim 1, wherein transmitting the latency packet via the network test device to the at least one remote node in a communication network causes the at least one remote node to generate the third timestamp and the fourth timestamp and transmit the third timestamp and the fourth timestamp to the network test device.

5. The method of claim 1, wherein the remote node is a second network test device.

6. The method of claim 1,
   wherein the latency packet comprises one or more bits,
   wherein generating the first timestamp associated with transmission of the latency packet comprises generating the first timestamp once a first bit of the latency packet is transmitted to the remote node,
   wherein generating the second timestamp associated with receiving the latency packet comprises generating the second timestamp once a first bit of the latency packet is received by the network test device.

7. A network test apparatus, comprising:
   one or more network interfaces including a hardware media access controller, the one or more interfaces configured to communicate in a communication network;
   one or more hardware processors; and
   one or more software modules stored on a memory and executable by the one or more processors, the one or more modules configured to:
   transmit a latency packet to at least one remote node of the communication network;
   generate a first timestamp associated with transmission of the latency packet;
   receive the latency packet, the latency packet being reflected from the at least one remote node;
   generate a second timestamp associated with receiving the latency packet;
   receive a third timestamp and a fourth time stamp, the third timestamp being associated with receipt of the latency packet by the at least one remote node and the fourth timestamp being associated with transmission of the latency packet to the network test device by the at least remote one node, wherein the third and fourth timestamps are transmitted by the at least one remote node in one or more packets different from the latency packet, wherein the third and fourth timestamps are recorded and then transmitted by the at least one remote node in one or more data packets different from the latency packet; and
   determine a network latency of the communication network based on a difference between the second timestamp and the first timestamp and a difference between the fourth timestamp and the third timestamp.

8. The network test apparatus of claim 7, wherein the one or more modules configured to determine the network latency of the communication network when executed by the processor are further configured to:
   determine the network latency of the communication network by subtracting the difference between the fourth timestamp and the third timestamp from the difference between the second timestamp and the first timestamp.

9. The network test apparatus of claim 7, wherein the one or more modules, when executed by the processor, are further configured to:
   index each of the first timestamp, the second timestamp, the third timestamp and the fourth timestamp according to a corresponding sequence number.

10. The network test apparatus of claim 7, wherein the one or more modules are configured to transmit the latency packet to the at least one remote node is configured to cause the at least one remote node to generate the third timestamp and the fourth timestamp and transmit the third timestamp and the fourth timestamp to the network test device.

11. The network test apparatus of claim 7,
    wherein the latency packet comprises one or more bits,
    wherein the process to generate the first timestamp associated with transmission of the latency packet, when executed by the processor is further operable to generate the first timestamp once a first bit of the latency packet is transmitted to the remote node,
    wherein the process to generate the second timestamp associated with receiving the latency packet, when executed by the processor, is further operable to generate the second timestamp once a first bit of the latency packet is received by the network test device.

12. A tangible, non-transitory, computer-readable media having software encoded thereon, the software, when executed by a processor, operable to:
transmit a latency packet via a network test device to at least one remote node in a communication network;
generate, via the network test device, a first timestamp associated with transmission of the latency packet;
receive the latency packet at the network test device, the latency packet being reflected from the at least one remote node;
generate a second timestamp associated with receiving the latency packet at the network test device;
receive a third timestamp at the network test device, the third timestamp being associated with receipt of the latency packet by the at least one remote node;
receive a fourth timestamp at the network test device, the fourth timestamp being associated with transmission of the latency packet to the network test device by the at least remote one node, wherein the third and fourth timestamps are transmitted by the at least one remote node in one or more packets different from the latency packet, wherein the third and fourth timestamps are recorded and then transmitted by the at least one remote node in one or more data packets different from the latency packet; and
determine a network latency of the communication network via the network test device based on a difference between the second timestamp and the first timestamp and a difference between the fourth timestamp and the third timestamp.

13. The computer-readable media of claim 12, wherein the software, when executed by the processor to determine network latency of the communication network, is further operable to:
determine the network latency of the communication network by subtracting the difference between the fourth timestamp and the third timestamp from the difference between the second timestamp and the first timestamp.

14. The computer-readable media of claim 12, wherein the software, when executed by the processor, is further operable to:
index each of the first timestamp, the second timestamp, the third timestamp and the fourth timestamp according to a corresponding sequence number.

15. The computer-readable media of claim 12, wherein the software, when executed by the processor to transmit the latency packet via the network test device to the at least one remote node in a communication network, is further operable to cause the at least one remote node to generate the third timestamp and the fourth timestamp and transmit the third timestamp and the fourth timestamp to the network test device.

16. The computer-readable media of claim 12, wherein the latency packet comprises one or more bits,
wherein the software, when executed by the processor to generate the first timestamp associated with transmission of the latency packet is further operable to generate the first timestamp once a first bit of the latency packet is transmitted to the remote node, and
wherein the software, when executed by the processor to generate the second timestamp associated with receiving the latency packet, is further operable to generate the second timestamp once a first bit of the latency packet is received by the network test device.

* * * * *